United States Patent [19]
Yip

[11] Patent Number: 5,960,709
[45] Date of Patent: Oct. 5, 1999

[54] FOOD PROCESSOR

[76] Inventor: Chung Lun Yip, 3rd Floor, Blocks A & C King Yip Factory Building, No. 59 King Yip Street, Kwun Tong, Kowloon, The Hong Kong Special Administrative Region of the People's Republic of China

[21] Appl. No.: 09/227,585

[22] Filed: Jan. 8, 1999

[51] Int. Cl.$^6$ .............................. A23N 1/02; A47J 43/06; B02C 18/18; B02C 25/00
[52] U.S. Cl. ................. 99/510; 99/495; 241/92; 241/199.12; 241/282.1
[58] Field of Search ................ 99/492, 495, 509–513, 99/623–631; 241/92, 93, 37.5, 68, 282.1, 282.2, 199.12, 101.2, 285.1, 280, 166; 83/355, 356.3, 592, 326, 932, 423, 435.2

[56] References Cited

U.S. PATENT DOCUMENTS

| | | | |
|---|---|---|---|
| 4,198,887 | 4/1980 | Williams, Jr. | 83/592 X |
| 4,227,655 | 10/1980 | Williams | 241/92 |
| 4,277,995 | 7/1981 | Sontheimer | 83/592 X |
| 4,283,979 | 8/1981 | Roakocy | 241/92 X |
| 4,331,300 | 5/1982 | Hicks et al. | 241/282.1 |
| 4,369,680 | 1/1983 | Williams | 99/510 X |
| 4,393,737 | 7/1983 | Shibata | 241/282.2 X |
| 4,448,100 | 5/1984 | Breeden | 241/92 X |
| 4,700,901 | 10/1987 | McClean | 241/282.1 |
| 4,706,896 | 11/1987 | Moon-Kau | 241/37.5 |
| 4,768,429 | 9/1988 | Federighi | 99/623 X |
| 4,840,119 | 6/1989 | Caldi | 99/513 X |
| 5,435,237 | 7/1995 | Huang | 99/510 |

*Primary Examiner*—Timothy F. Simone
*Attorney, Agent, or Firm*—Leydig, Voit & Mayer, Ltd.

[57] ABSTRACT

A food processor includes a lid having an opening for receiving food, a container below the lid and having an opening provided with a metal ring, a food cutting disc for use at the opening and provided with a number of metal parts for contact with the metal ring, and a handle for rotating the cutting disc to cut the food received. The metal ring and parts are provided for contact with each other to resist wear-and-tear through relative rotation between the cutting disc and the container.

13 Claims, 3 Drawing Sheets

FOOD PROCESSOR

The present invention relates to a food processor and, particularly but not exclusively, to one which is manual operated.

SUMMARY OF THE INVENTION

According to the invention, there is provided a food processor which comprises a lid having an opening for receiving food, a container below the lid and having an opening provided with a first metal part, a food processing implement for use at the opening of the container and provided with a second metal part for contact with the first metal part, and means for rotating the implement to process the food received, said two metal parts being provided for contact with each other to resist wear-and-tear through relative rotation between the implement and the container.

Preferably, either of the metal parts is in the form of a ring.

More preferably, the member provided with the metal part in the form of a ring is formed with an annular groove for locating the ring.

Further more preferably, the member provided with the metal part in the form of a ring is the container, and the groove is formed in a rim at the opening of the container.

It is preferred that the other metal part is in the form of a plurality of discrete pieces.

More preferably, the metal pieces are provided by respective plates shaped to lie flat against the surface of the member provided with such metal pieces.

Further more preferably, the metal pieces are fixed in position by screws.

It is preferred that the member provided with said other metal part is the food processing implement.

In a preferred embodiment, the metal parts are of stainless steel material.

The food processor may preferably include a housing which is closable by the lid and contains the container which is removable.

More preferably, the housing has a base provided with a suction member for releasable attachment onto a horizontal surface.

In a preferred embodiment, the food processing implement is substantially flat and selected from a group comprising a slicer and a grater.

In a specific construction, the means for rotating the food processing implement comprises a shaft engageable with the implement and a handle for rotating the shaft.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
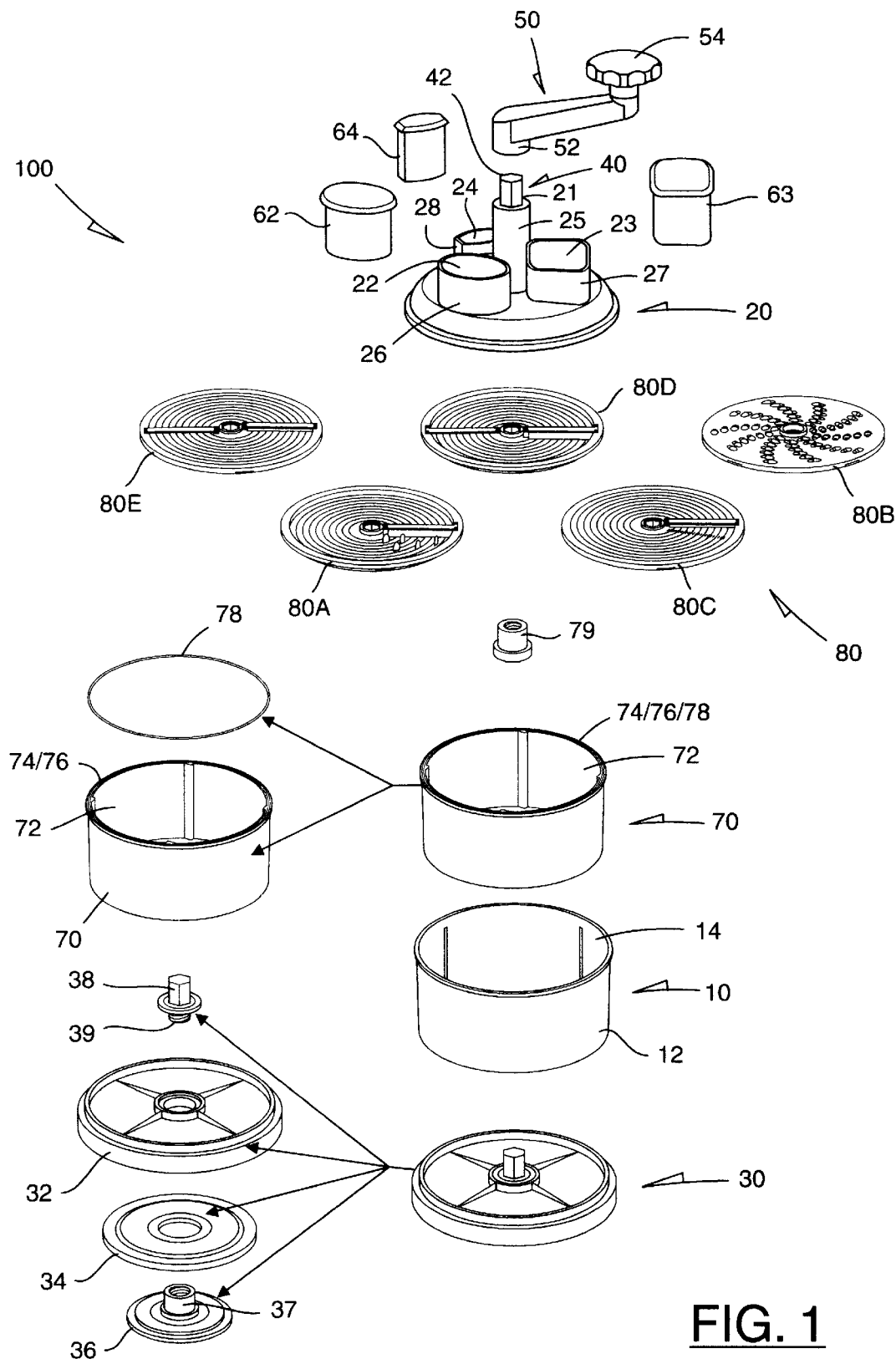
FIG. 1 is an exploded perspective view of an embodiment of a food processor in accordance with the invention.

Referring to the drawings, there is shown a food processor 100 embodying the invention, which processor 100 comprises a plastics cylindrical housing 10 having a peripheral wall 12 and an open top end 14, a circular lid 20 for closing the housing's open top end 14, and a disc-like base 30 for use below the housing 10. The lid 20 has a central opening 21 formed with an integral upstanding tube 25 and includes three side openings 22 to 24 around the central opening 21 and formed with respective integral upstanding sleeves 26 to 28 which are relatively shorter than the tube 25.

The tube 25 embraces a central shaft 40 and supports it for rotation by means of a separate handle 50. The shaft 40 has an externally splined upper end 42 and a hexagonal lower end (not shown) which extends through the central opening 21 into the housing 10 below and includes a screw-threaded extreme end portion for engagement by a nut member 79. The handle 50 has an internally splined end 52 for coupling with the shaft's upper end 42 and a turning knob 54 at the other end for manual rotation. The sleeves 26 to 28 have different shapes/sizes, through which food items of different types/shapes or pre-cut to different sizes may be pressed down into the housing 10, received via the corresponding side openings 22 to 24, by means of respective press boxes 62 to 64 matching the sleeves 26 to 28.

The base 30 has a plastics body disc 32 and incorporates a co-axial bottom rubber suction disc 34 for releasable attachment onto a horizontal work top surface. The suction disc 34 is operated by means of a pulling disc 36 which is close fitted within a flat bottom recess of the suction disc 34 and includes a central collar 37 extending upwards through a central hole of the suction disc 34. The collar 37 is internally screw-threaded for engaging a screw member 38 provided on the body disc 32. The screw member 38 has an externally screw-threaded lower end 39 which extends downwards through a central hole of the body disc 32 for engaging the collar 37 below. Upon tightening by means of the handle 50, the screw member 38 will stretch the central portion of the suction disc 34 upwards relatively to its peripheral portion, which in turn will perform a suction action for attaching the base 30 onto the work top surface, for subsequently locating the housing 10.

The food processor 100 includes an internal plastics cylindrical container 70 and a set of five substantially flat plastics food cutting discs 80 (80A to 80E) for selective use on the container 70 inside the housing 10. The container 70 is put into the housing 10 for use in a stationary manner and has an open top end 72 providing a circular rim 74. The rim 74 is formed with an upward facing annular groove 76, in which a metal or stainless steel ring 78 is located (as best shown in FIG. 4).

Figure 2:
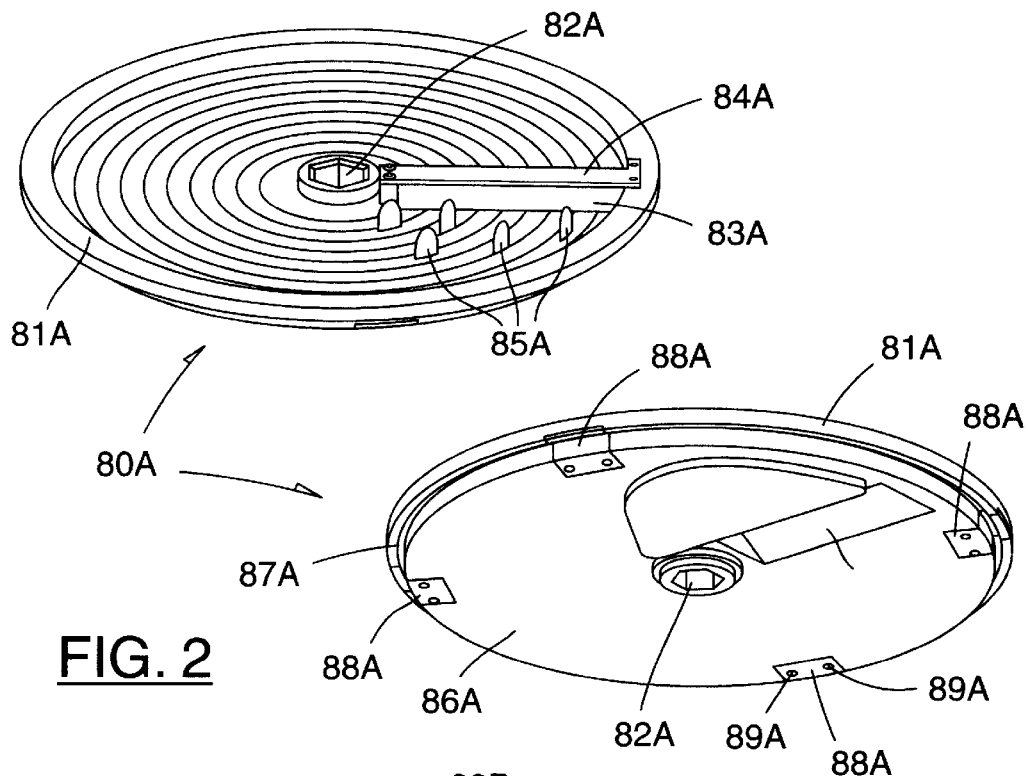
FIG. 2 consists of top and bottom perspective views of a first cutting disc of the food processor of FIG. 1.

A first cutting disc 80A is shown in FIG. 2, which has a tray-like plastics body 81A formed with a hexagonal central aperture 82A and a radially extending slot 83A. A metal or stainless steel slicing blade 84A is mounted immediately above and parallel to the slot 83A, in a slightly inclined manner, for slicing food items pressed down through the side openings 22 to 24 of the lid 20. Five cutting tips 85A are provided on the body 81A in front of the slicing blade 84A for food cutting prior to slicing. The disc body 81A has a bottom side 86A which is slightly reduced in diameter, forming a stepped periphery 87A, for loose fitting into the rim 74 of the container 70. The bottom side 86A is provided, around its periphery 87A, with four equi-angularly spaced discrete metal parts 88A. The metal parts 88A are formed by respective stainless steel plates which are folded or shaped to lie flat against the stepped surface of the periphery 87A and fixed in position by means of respective pairs of screws 89A.

Figure 3:
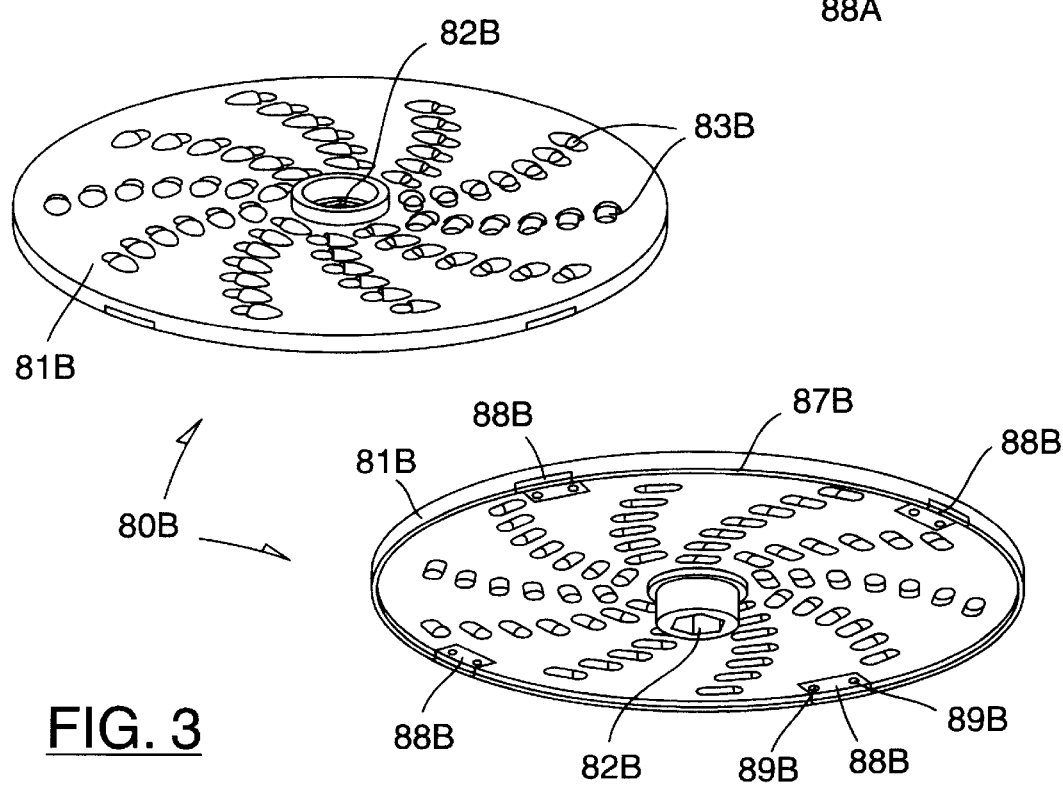
FIG. 3 consists of top and bottom perspective views of a second cutting disc of the food processor of FIG. 1.

A second cutting disc 80B is shown in FIG. 3, which has an inverted-tray-like plastics body 81B formed with a hexagonal central aperture 82B and ten spirally extending series of grating holes 83B. The disc body 81B has a depending peripheral flange 87B which is confined by the peripheral wall 12 of the housing 10 to rest on the rim 74 of the container 70. The flange 87B is provided with four equi-angularly spaced discrete metal parts 88B. The metal parts 88B are formed by respective stainless steel plates which are folded or shaped to lie flat against the surface of and riding across opposite sides of the flange 87B and fixed in position by means of respective pairs of screws 89B.

Figure 4:
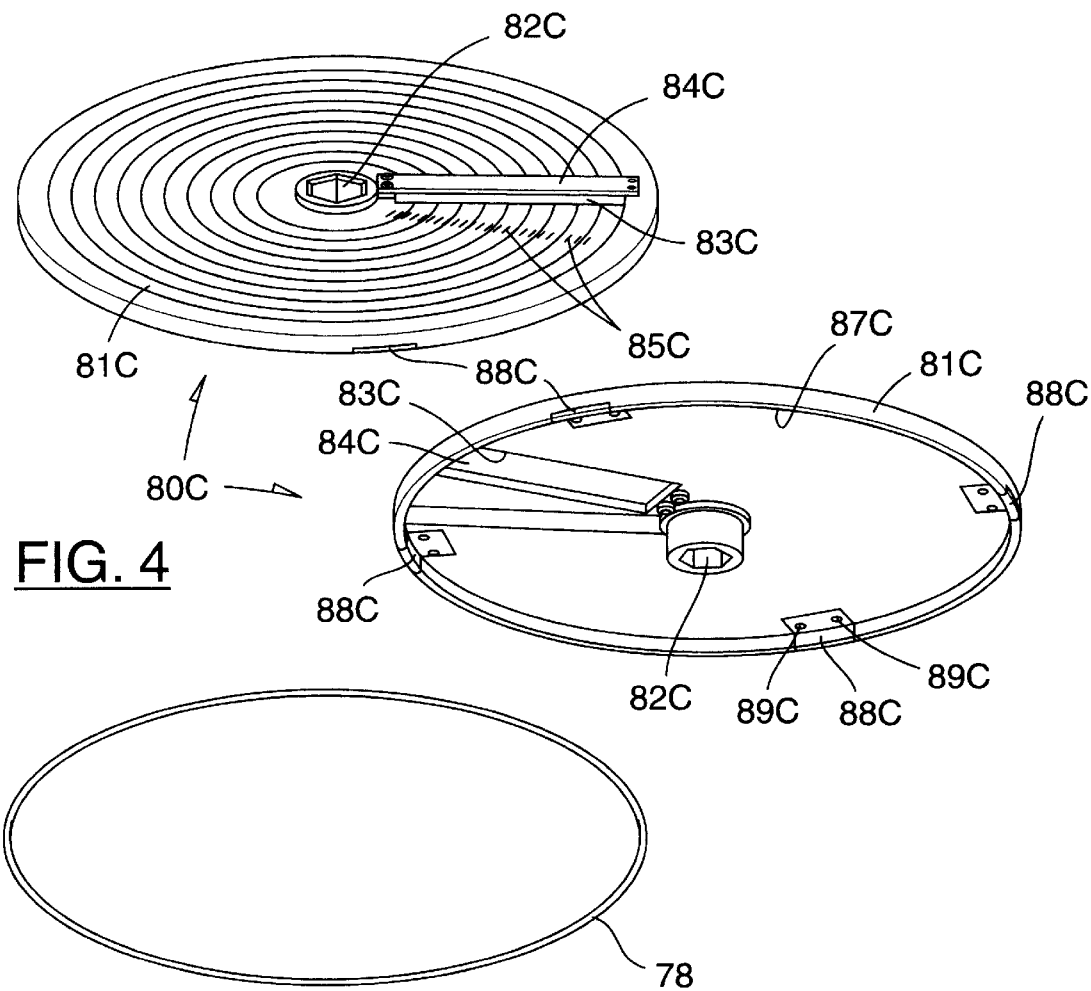
FIG. 4 consists of top and bottom perspective views of a third cutting disc of the food processor of FIG. 1.
Figure 5:
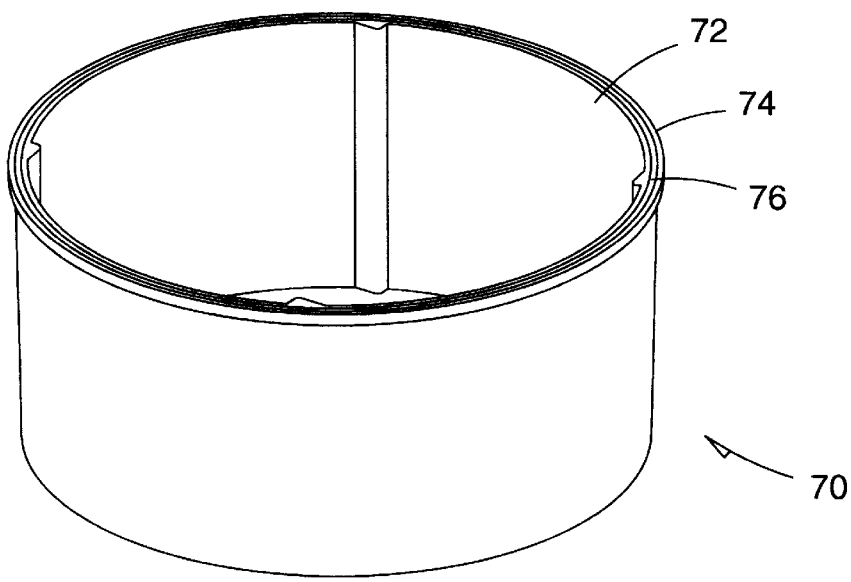
FIG. 5 is a perspective view of an internal container of the food processor of FIG. 1 for supporting either one of the cutting discs of FIGS. 2 to 4.

A third cutting disc 80C is shown in FIG. 4, which has an inverted-tray-like plastics body 81C formed with a hexagonal central aperture 82C and a radially extending slot 83C. A metal or stainless steel slicing blade 84C is mounted immediately above and parallel to the slot 83C, in a slightly inclined manner, for slicing food items pressed down through the side openings 22 to 24 of the lid 20. A series of twenty-four cutting tips 85C are provided on the body 81C in front of the slicing blade 84C for food cutting prior to slicing. The disc body 81C has a depending peripheral flange 87C which is confined by the peripheral wall 12 of the housing 10 to rest on the rim 74 of the container 70. The flange 87C is provided with four equi-angularly spaced discrete metal parts 88C. The metal parts 88C are formed by respective stainless steel plates which are folded or shaped to lie flat against the surface of and riding across opposite sides of the flange 87C and fixed in position by means of respective pairs of screws 89C.

In operation, the cutting disc 80A/80B/80C is attached to the lower end of the shaft 40, which passes through the disc central hole 82A/82B/82C and is then closed by the nut member 79, for covering the lower side of the lid 20, with the disc periphery supported by the container 70 against the food items being pressed down for cutting. The cutting disc 80A/80B/80C is then rotatable by means of the shaft 40 through engagement between the hexagonal central hole 82A/82B/82C and the hexagonal lower end of the shaft 40. The cutting disc 80A/80B/80C and the container 70 are in physical contact with each other only by their respective metal parts 88A/88B/88C and metal ring 78, which are resistant to wear-and-tear through relative rotation between the disc 80A/80B/80C and the container 70, thereby protecting the plastics bodies of the disc 80A/80B/80C and container 70 and preventing the formation of undesirable plastics dust. The cut food is collected in the container 70, which is removable from the housing 10 for the cut food to be used.

The other two cutting discs 80D and 80E have construction and operation similar to those of the first/third cutting disc 80A/80C, likewise for food slicing. It is envisaged that any other suitable food processing implements may be used, instead of the cutting discs 80, for food grinding, juice extraction or the like.

Insofar as the metal ring 78 and metal parts 88A/88B/88C are concerned, they may be swapped between the container 70 and the cutting disc 80A/80B/80C. As a further change of design, the metal parts 88A/88B/88C may be replaced by a flat circular loop for sliding contact with the metal ring 78.

The food processor of the invention may alternatively be driven by an electric motor via an associated gear train.

The invention has been given by way of example only, and various other modifications of and/or alterations to the described embodiment may be made by persons skilled in the art without departing from the scope of the invention as specified in the appended claims.

What is claimed is:

1. A food processor comprising a lid having an opening for receiving food, a container below the lid and having an opening provided with a first metal part, a food processing implement for use at the opening of the container and provided with a second metal part for contact with the first metal part, and means for rotating the implement to process the food received, said two metal parts being provided for contact with each other to resist wear-and-tear through relative rotation between the implement and the container.

2. A food processor as claimed in claim 1, wherein either of the metal parts is in the form of a ring.

3. A food processor as claimed in claim 2, wherein the member provided with the metal part in the form of a ring includes an annular groove for locating the ring.

4. A food processor as claimed in claim 3, wherein the member provided with the metal part in the form of a ring is the container, and the groove is located in a rim at the opening of the container.

5. A food processor as claimed in claim 2, wherein the other metal part is in the form of a plurality of discrete pieces.

6. A food processor as claimed in claim 5, wherein the metal pieces are provided by respective plates shaped to lie flat against the surface of the member provided with such metal pieces.

7. A food processor as claimed in claim 6, wherein the metal pieces are fixed in position by screws.

8. A food processor as claimed in claim 5, wherein the member provided with said other metal part is the food processing implement.

9. A food processor as claimed in claim 1, wherein the metal parts are of stainless steel material.

10. A food processor as claimed in claim 1, including a housing which is closable by the lid and contains the container which is removable.

11. A food processor as claimed in claim 10, wherein the housing has a base provided with a suction member for releasable attachment onto a horizontal surface.

12. A food processor as claimed in claim 1, wherein the food processing implement is substantially flat and selected from a group comprising a slicer and a grater.

13. A food processor as claimed in claim 1, wherein the means for rotating the food processing implement comprises a shaft engageable with the implement and a handle for rotating the shaft.

* * * * *